Patented June 17, 1941

2,246,466

UNITED STATES PATENT OFFICE 2,246,466

PROCESS OF PREPARING VEGETABLE PROTEIN

Percy L. Julian, Oak Park, and Bernard T. Malter, Chicago, Ill., assignors to The Glidden Company, Cleveland, Ohio, a corporation of Ohio No Drawing. Application December 24, 1937, Serial No. 181,606

5 Claims. (Cl. 260—112)

This invention relates to the manufacture of adhesive and protein from proteinaceous oleaginous seeds, such as soy beans, peanuts, linseed, cottonseed, lupines, etc.

It has long been realized that such seed materials were an excellent source of protein and that they were a raw material for the production of vegetable protein, adhesives, etc.

The use of ground meal prepared from the whole oil extracted seed, for adhesive purposes is known. The protein prepared from the seeds by alkali extraction has also been used for various adhesive purposes, such as paper coating, paints, films, and adhesives per se. The potential utility of such adhesives, however, has never been fully realized due to certain inherent defects therein. The viscosity of these materials when dissolved in alkalis was high, and moreover, they formed stiff gels on standing. Also, the adhesive strength was poor as compared to casein, for example. The high viscosity and gelling made them difficult to handle and the gelling tendency practically precluded their use for paper coating, paints, films, etc.; also, the color was dark.

Various procedures have been proposed and employed to overcome these difficulties. The use of strongly alkaline solutions has been used to lower the viscosity. This, however, increases color and does not prevent gelling. In the case of isolated protein adhesives, the use of lime in the extraction has been resorted to as set out in U. S. Patent 1,955,375. These various processes have resulted in considerable improvement, but for many purposes the adhesive or protein could not be used as a substitute for casein. The strongly alkaline treatments, while improving viscosity and adhesion resulted in increased color, and if too severe, resulted in lowered adhesion. Also, the alkaline protein solutions of the material would gel on standing.

It has been found, however, that by the present invention, the color, adhesion, viscosity, and gelling tendency of alkaline solutions of the proteinaceous material can all be improved. The process is applicable to the preparation of adhesive from the meal or flour, or from the isolated vegetable protein, either as such or in the process of isolation.

It is, therefore, an object of the invention to provide a process for improving the color, adhesion, viscosity, and gelling tendency of vegetable proteinaceous adhesives.

A further object is to provide a process for improving the color, viscosity, adhesion and gelling tendency of isolated vegetable protein.

Another object is to provide a process whereby the color, viscosity, adhesion, and gelling tendency of adhesives made from the meal prepared from proteinaceous seeds and nuts is improved.

Other objects will be apparent from the description to follow.

According to the invention, the vegetable protein material is treated with sodium peroxide. It has been found that if the protein is subjected to a treatment with sodium peroxide, that the color, adhesion, viscosity and gelling tendency are all improved.

The following is illustrative of the invention and shows the application of the invention as applied to soy beans.

EXAMPLE 1

11# of sodium peroxide was added to 3600 gallons of the alkaline extract of protein from soy beans prepared according to the Cone and Brown Patent 1,955,375, and allowed to stand for several hours. 4–5 hours has been found to give good results, although a longer time is not harmful, the time being balanced against the cost of the process, etc. For example, it may be that carrying out the complete process for the isolation of the protein that the time of contact is 6–8 hours or longer. A shorter time may also be employed but the improvement in the product is not quite as good, everything else being equal. Also, the amount of sodium peroxide may be varied over wide limits, it having been found that sodium peroxide in any amount produces improved results. For practical purposes, the amount of sodium peroxide may vary between 0.5 and 10.0%, based on the weight of the protein present. Instead of adding the sodium peroxide to the alkali extract, it can be added to the alkaline slurry of the soy bean material.

After the treatment of the alkaline extract with sodium peroxide acid is added to lower the pH of the solution. At a pH corresponding to the isoelectric point of the protein the protein is precipitated. The precipitated curd is then separated from the whey, washed, dried, and ground.

Table I shows the effect of the sodium peroxide treatment on the color, viscosity, adhesion, and gelling tendency of the protein as the process is applied according to Example 1 as compared to the same treatment without any sodium peroxide, similar improvements being obtained when treating the protein at other stages.

TABLE I (a) $Na_2O_2$ added

| Batch | MacMichael viscosity | Pipette viscosity | Pick Oxford waxes | Color | Gel |
|---|---|---|---|---|---|
| 356 | 1.0− | 33.3 | 35 | 1 | After 1 hr. thin—no gel. Overnight—same. |
| 361 | 1.0− | 33.1 | 40 | 1 | After 4 hrs. thin—no gel. Overnight—same. |
| 353 | 1.0− | 32.2 | 40 | 1 | After 1 hr. thin—no gel. Overnight—same. |
| 373 | 1.0 | 36.4 | 40 | 1 | After 1 hr. thin—no gel. Overnight—thick body—no gel. |
| 358 | 1.0− | 32.2 | 45 | 1 | After 4 hrs.—thin body—no gel. Overnight—same. |
| 375 | 1.0− | 32.4 | 40 | 1+ | After 2 hrs.—thin—no gel. Overnight—same. |

(b) Blank—no $Na_2O_2$

| Batch | MacMichael viscosity | Pipette viscosity | Pick Oxford waxes | Color | Gel |
|---|---|---|---|---|---|
| 356 | 5 | 42.0 | 35 | 1+ | Gel after 1 hr. |
| 361 | 2.5 | 40.7 | 25 | 1 | Gel after 4 hrs. |
| 353 | 1.0− | 36.8 | 45 | 2− | After 1 hr. thick body. Overnight—gel. |
| 373 | 17.5 | 52.1 | 25 | 1+ | Gel ½ hr. |
| 358 | 1.5 | 37.8 | 30 | 1 | 4 hrs. thick body. Overnight—gel. |
| 375 | 1 | 35.0 | 40 | 1+ | After 2 hrs. thin body. Overnight—heavy body. |

For making these test cuts of the various protein samples were made by mixing 10 parts of the protein with 50 parts of water and adding 10 parts of 10% soda ash solution at 160 deg. F. These cuts were used for determining the gelling tendency and color. The color was observed by the naked eye and gel tendency by allowing the cut to stand for awhile and cool to room temperature. For the pipette viscosity the cuts were diluted with water to a 10 to 1 water-to-protein ratio and the time in seconds required for the material contained between two marks in a pipette to flow out of the pipette at 20 deg. C., was noted.

For the MacMichael clayslip viscosity and the pick tests 70 cc. of original cut was added to 40 g. of English coating clay slurried in 62 cc. of water. A portion of this slip was then coated on paper and the adhesive strength determined by means of Oxford waxes. Oxford waxes are waxes of varying standardized melting points used to determine the adhesion of paper coating by determining the highest number of the wax which will not pick off the coating when the wax is removed. The MacMichel viscosimeter employs the torsion principle. This is accomplished by measuring the torque or twist imparted to a standard wire of known length by the cylindrical plunger which is suspended on the wire in a rotating cup containing the material, the viscosity of which is being determined. The cup has a capacity of 35 cc. and is rotated at the rate of 20 R. P. M. It is jacketed and kept at a temperature of 70 to 80 deg. F. at all times during the determination. The cylindrical plunger is 1 cm. in diameter and is submerged 4 cm. in the material. The wire is standard #30 wire of the MacMichael viscosimeter, gramercy model. The torque is measured in units (300 units per 360 degrees) and is read carefully after five minutes of application in order that a constant value is obtained.

In order to determine whether or not the effect on viscosity was due to the alkali action of the sodium peroxide, comparative tests were run using various amounts of sodium hydroxide and sodium peroxide, and the MacMichael viscosities of clayslips of the protein were determined in each case. Table II gives the results of these tests.

TABLE II

| Percent material added based on protein | .6 | 1.2 | 1.8 | 2.4 | 3 | 6 |
|---|---|---|---|---|---|---|
| MacMichael viscosity NaOH added | 72 | 74 | 44 | 31 | 31 | 3 |
| MacMichael viscosity $Na_2O_2$ added | 38.5 | 18 | 9.5 | 8.5 | 4 | 1.5 |

A study of Table I shows that there is an improvement in viscosity, adhesion, gelling tendency, and color of the treated protein over the untreated. Moreover, the viscosity of the treated material is more uniform for different batches than in the case of the untreated protein. The color and adhesion is also more uniform than in the untreated protein. This uniformity of product in addition to the improvement in the properties, is very important to users of the material. It is also desired to call attention to batches 353 and 375. The proteins used in these runs were some which had been subjected to quite a severe alkaline treatment so as to give good adhesion and viscosity. It is to be noted, however, that the color is off in both and that the cuts containing no sodium peroxide produced gels or gave a heavy body after standing over night.

Table II definitely shows that it is not increased alkalinity which is responsible for the improved viscosity. Although more alkali reduces the viscosity, this is an old expedient and is not here responsible for the results attained.

It is believed that the improved results are due to the synthesis of amine oxides from the protein complexes containing tertiary amino groups. These amine oxides are more soluble than the tertiary amino compounds and give solutions of lower viscosity. With sodium peroxide in dilute solution, the action is probably slower and steadier than with hydrogen peroxide and the formation of amine oxides consequently more complete over a given period.

The protein prepared according to the present invention is particularly useful in the manufacture of cold water paint pastes. Vegetable proteins heretofore prepared have not been satisfactory for this purpose. The protein prepared according to the Julian and Engstrom application, Serial No. 177,926 filed December 3, 1937, more closely approaches in its behavior the action of casein in this use than any of the prior vegetable protein. When, however, this protein is used in certain paint and calcimine formulations in the requisite quantities, the paint paste gradually sets up in the can to a jelly-like mass which does not have the flow of casein paints and which does not thin down well with water, a customary procedure. This setting to a gel of the protein prepared according to the above mentioned Julian and Engstrom application has its basis in the increased viscosity and lowered pH occasioned by the addition of such substances as fatty acids, which have been found to be desirable additions to the paint formula. Thus even greater lowering of the viscosity than that achieved in the above mentioned Julian and Engstrom application must be attained if a satisfactory prepared paint of this character is to be made. Mere dilution of the paint cannot be resorted to in order to achieve this result since the amount of binder, casein or vegetable protein, must remain within accepted specifications of around 10%.

In order to obviate this difficulty caused by gelation in the can, resort has been had to increased hydrolysis with caustic. This causes deep seated decomposition of the cysteine and cystine portion of the protein nucleus with subsequent formation of considerable quantities of hydrogen sulfide, giving rise to darkening of color when even small quantities of iron, lead, etc. may be present in the ingredients of the paint formulation. Moreover the binding power of the protein is greatly impaired, for while sodium peroxide does decompose into caustic soda and nascent hydrogen peroxide in solution, small quantities of it may be used to produce an effect which would require detrimental qualities of caustic soda alone.

The protein may also be thinned down by means of enzymes, after dissolving in alkali to prepare the paint. This has the disadvantage, however, that devices must be resorted to to stop the action of the enzyme at the proper point, else deep-seated proteolysis is secured. This deep-seated proteolysis causes lowering of the water-resistance and washability of the paint when excess caustic alkali and enzymes are used, and in the case of the latter induces an insoluble sediment in the clear paint base before addition of pigments. Such paints would tend to settle out and not be uniform.

The protein prepared according to the above teachings obviates all of these difficulties and represents so far as we know the first and only really satisfactory vegetable protein for water paste paints in place of milk casein. It has the great advantage over milk casein that it does not spoil nearly as rapidly and requires little or no preservative. The viscosities of clear base obtained with the protein prepared in accordance with this invention have been found to be very satisfactory for water paints, and consequently this type of protein opens up a wide field for vegetable proteins in paints of this type.

The lowered viscosity of the protein material makes its use easier on paper coating mills, etc., since the slips are easier to prepare and require less power costs. The reduction in gelling tendency is desirable since when solutions set to a gel on standing, they must either be discarded or can only be used after considerable expense in re-working. Also, the gelling of the protein results in uneven spreading and causes roughness in the coating. This roughness and unevenness is even more pronounced in the case of films prepared from a protein which gels.

The process may be applied to the protein prepared according to the above mentioned Julian and Engstrom application whereby even better viscosities are obtained.

While certain illustrative examples have been given, it will be apparent that various modifications and changes therein can be made without departing from the scope and spirit of the invention.

What is claimed as new and is desired to secure by Letters Patent of the United States is:

1. The process of preparing a derived vegetable protein which comprises digesting an aqueous alkaline solution of protein found in proteinaceous oleaginous seed and nut material with sodium peroxide in an amount and for a time sufficient to reduce the viscosity of the protein.

2. The process of preparing a derived vegetable protein comprising digesting an aqueous alkaline solution of extracted protein found in proteinaceous oleaginous seed and nut material with sodium peroxide in an amount and for a time sufficient to reduce the viscosity of the protein.

3. The process of preparing a derived vegetable protein comprising digesting an aqueous caustic alkali and lime solution of extracted protein found in proteinaceous oleaginous seed and nut material with sodium peroxide in an amount and for a time sufficient to reduce the viscosity of the protein.

4. The process of preparing a derived soybean protein which comprises digesting an aqueous alkaline solution of extracted soybean protein with sodium peroxide in an amount and for a time sufficient to reduce the viscosity of the protein.

5. The process of preparing a derived soybean protein which comprises digesting an aqueous caustic alkali and lime solution of extracted soybean protein with sodium peroxide in an amount and for a time sufficient to reduce the viscosity of the protein.

PERCY L. JULIAN.
BERNARD T. MALTER.